United States Patent [19]

Riffe

[11] Patent Number: 5,352,342

[45] Date of Patent: Oct. 4, 1994

[54] METHOD AND APPARATUS FOR PREVENTING CORROSION OF METAL STRUCTURES

[75] Inventor: William J. Riffe, 510 Fisher St., Morehead City, N.C. 28557

[73] Assignees: William J. Riffe; Otho L. Graham, both of Morehead City, N.C.

[21] Appl. No.: 34,783

[22] Filed: Mar. 19, 1993

[51] Int. Cl.$^5$ .............................................. C23F 13/00
[52] U.S. Cl. ...................................... 204/147; 204/196
[58] Field of Search ................................ 204/147, 196

[56] References Cited

U.S. PATENT DOCUMENTS 5,009,757  4/1991  Riffe et al. ........................... 204/196
5,055,165  10/1991  Riffe et al. ........................... 204/196

OTHER PUBLICATIONS

PCT Search Report No. PCT/US94/02801, dated Jun. 2, 1994.

*Primary Examiner*—John Niebling
*Assistant Examiner*—Kishor Mayekar
*Attorney, Agent, or Firm*—Oblon, Spivak, McClelland, Maier & Neustadt

[57] ABSTRACT

A system for preventing corrosion of a surface of a metal structure in contact with a corrosive environment comprising:
(a) a conductive zinc silicate coating in conductive contact with at least part of the surface, wherein the conductive zinc silicate coating forms an interfacial layer between the surface and the corrosive environment; and
(b) means for imparting a net negative bias to the metal structure, wherein the means comprise a power supply means having a negative terminal directly coupled to the metal structure and a positive terminal coupled to a portion of the metal structure, remote from the negative terminal, by way of a capacitor or resistor, and a method of preventing corrosion using the system.

23 Claims, 4 Drawing Sheets

| Fe | Fe$_2$O$_3$ | Fe$_2$SiO$_4$ | METALLIC SILICATE | Zn$_2$SiO$_4$ | ZnO WITH INTER- STITIAL Al$^{3+}$ IONS | Zn |

METHOD AND APPARATUS FOR PREVENTING CORROSION OF METAL STRUCTURES

BACKGROUND OF THE INVENTION

1. Field of the Invention

The present invention relates generally to methods and systems for preventing corrosion of metal structures.

2. Discussion of the Background Art

In the construction of large metal structures, steel remains the economic choice of materials. Unfortunately, steel has a tendency to corrode over time.

A variety of methods for controlling corrosion have evolved over the past several centuries, with particular emphasis on methods to extend the life of metallic structures in corrosive environments. These methods typically include protective coatings which are used principally to upgrade the corrosion resistance of ferrous metals, such as steel, and some nonferrous metals, such as aluminum, and to avoid the necessity for using more costly alloys. Thus, they both improve performance and reduce costs. However, such protective coatings typically have several pitfalls.

Protective coatings fall into two main categories. The largest of these categories is the topical coating such as a paint, that acts as a physical barrier against the environment. The second category consists of sacrificial coatings, such as zinc or cadmium, that are designed to preferentially corrode in order to save the base metal from attack.

Cathodic protection and coatings are both engineering disciplines with a primary purpose of mitigating and preventing corrosion. Each process is different: cathodic protection prevents corrosion by introducing an electrical current from external sources to counteract the normal electrical chemical corrosion reactions whereas coatings form a barrier to prevent the flow of corrosion current or electrons between the naturally occurring anodes and cathodes or within galvanic couples. Each of these processes provided limited success. Coatings by far represent the most widespread method of general corrosion prevention (see Leon et al U.S. Pat. No. 3,562,124 and Hayashi et al U.S. Pat. No. 4,219,358). Cathodic protection, however, has been used to protect hundreds of thousands of miles of pipe and acres of steel surfaces subject to buried or immersion conditions.

The technique of cathodic protection is used to reduce the corrosion of the metal surface by providing it with enough cathodic current to makes its anodic disillusion rate become negligible (for examples, see Pryor, U.S. Pat. No. 3,574,801; Wasson U.S. Pat. No. 3,864,234; Maes U.S. Pat. No. 4,381,981; Wilson et al U.S. Pat. No. 4,836,768; Webster U.S. Pat. No. 4,863,578; and Stewart et al U.S. Pat. No. 4,957,612). The cathodic protection concept operates by extinguishing the potential difference between the local anodic and cathodic surfaces through the application of sufficient current to polarize the cathodes to the potential of the anodes. In other words, the effect of applying cathodic currents is to reduce the area that continues to act as an anode, rather than reduce the rate of corrosion of such remaining anodes. Complete protection is achieved when all of the anodes have been extinguished. From an electrochemical standpoint, this indicates that sufficient electrons have been supplied to the metal to be protected, so that any tendency for the metal to ionize or go into solution has been neutralized.

However, there is a strong divergence of opinion between the proponents of paint coatings and the proponents of cathodic protection. Proponents of "coatings only" are often on one side discounting the advantages of cathodic protection, claiming that a good, well applied coating is the only necessary protection for steel. On the other side, the proponents of cathodic protection often claim that any immersed or buried metal structure can best be protected by the installation of a well engineered cathodic protection system. There are many conditions under which one type of protection may be superior to the other. However, under most of the more commonly occurring conditions, the best conventional corrosion protection is actually a combination of both concepts. But even when the two concepts are combined, problems still occur.

Inorganic zinc coatings have functioned previously by allowing a limited sacrificial corrosion of the incorporated zinc to provide sufficient free electrons to preclude the removal of electrons from the underlying steel during the corrosion process. Under normal conditions of exposure in an industrial atmosphere, in the United States, a two mil coating could be expected to protect steel from corrosion for from four to six years depending upon the weather. Submerged in a salt water environment, the same coating would provide from one to two years of corrosion prevention to the underlying steel. When used to protect girder type highway bridges or automobile underbodies, inorganic zinc has proven less successful because the continuous contact with chloride ions and moisture accelerates the sacrifice of the metallic zinc in the coating and blisters off the various organic top coats.

The destruction of organic top coats over the inorganic zinc coatings has been particularly severe in those cases where impressed cathodic protection was attempted simultaneously. In general, the problem of top coating with organic top coats over inorganic zinc coatings has been the eventual intrusion of water through the organic coating that contacted the zinc and released sufficient hydrogen from the corrosion process to blister off the organic top coat. The destruction of organic top coats over inorganic zinc coatings has been particularly severe in those cases where impressed cathodic protection was attempted simultaneously. When impressed cathodic protection was applied to the system, the electric potential caused electroendomesis and blistered off the top coat even more quickly than when no current was applied.

In galvanic corrosion, those metals that have conducting or n-type semiconducting products (passive films, scales, and so forth) are at risk from the standpoint of localized attack caused by the ability of the surface films to support cathodic reactions and hence to provide a galvanic influence to the corrosion process. That is not to say that materials with nonconductant or p-type semiconducting films are not at risk. Aluminum is an obvious exception, as are results with very thin films (nickel and copper) that support electron transfer by tunnelling or surface states. It can be said, however, that the galvanic influence to localized corrosion, when it occurs in aqueous systems, requires a cathode material capable of supporting reduction of $H^+$. This is most likely to be the case for n-type semiconductors, intrinsic or degenerate conductors or for very thin films.

The products of corrosion, especially with solids, fall under three different categories, based on their ability to serve as electrodes, these three categories being insulators, semiconductors, and conductors. The dividing line between categories is quite hazy and a particular oxide or sulfide may exhibit a range of conductivity depending on its degree of stoichiometry.

It has been previously shown that corrosion is generally the development of a galvanic couple between anodic (oxidizing) sites and cathodic (reducing) sites upon a metallic surface immersed in a conductive solution of ionizable compounds, such as seawater. This galvanic couple allows the transfer of electrons through the corroding metal from the ions formed by oxidation at the anodic sites to reducible ions at the cathodic sites. The overall result is that metal is converted to its various compounds at the anodes and reduction of various ions takes place at the cathodes, until all of the original metal is converted to a lower chemical energy state.

SUMMARY OF THE INVENTION

Accordingly, one object of the present invention is to provide a method for preventing corrosion of metal structures by utilizing semiconductor technology and with no external anode, no electrolyte, and no current flow.

A further object of the present invention is to provide a system for protecting metal structures from corrosion, wherein the system provides long term protection with minimal system maintenance required.

A still further object of the present invention is to provide a system and method for preventing corrosion of metal structures which are either submerged in water, exposed to air, or a combination of both.

Another object of the present invention is to provide a system and method for preventing corrosion of marine structures which also functions to prevent fouling of the structures by marine organisms.

These and other objects have been satisfied by the discovery of a system for preventing corrosion of a surface or surfaces of a metal structure in contact with a corrosive environment, comprising:

(a) a conductive zinc silicate coating in conductive contact with at least part of the exterior surface of the metal structure, wherein the conductive zinc silicate coating forms an interfacial layer between the exterior surface and the corrosive environment; and (b) means for imparting a net negative bias to the metal structure, wherein the means comprise a power supply means having a negative terminal directly coupled to the metal structure and a positive terminal coupled to a portion of the metal structure, remote from the negative terminal, by way of a capacitor or resistor;

and the discovery of a corrosion prevention method comprising:

1) cleaning the external surface of a metal structure;
2) coating the external surface with an inorganic zinc silicate based coating; and
3) inducing and maintaining a net negative bias on the metal structure.

BRIEF DESCRIPTION OF THE FIGURES

A more complete appreciation of the invention and many of the attendant advantages thereof will be readily obtained as the same become better understood by reference to the following detailed description when considered in connection with the accompanying Figures, wherein.

DETAILED DESCRIPTION OF THE PREFERRED EMBODIMENTS

Figures 1, 2:
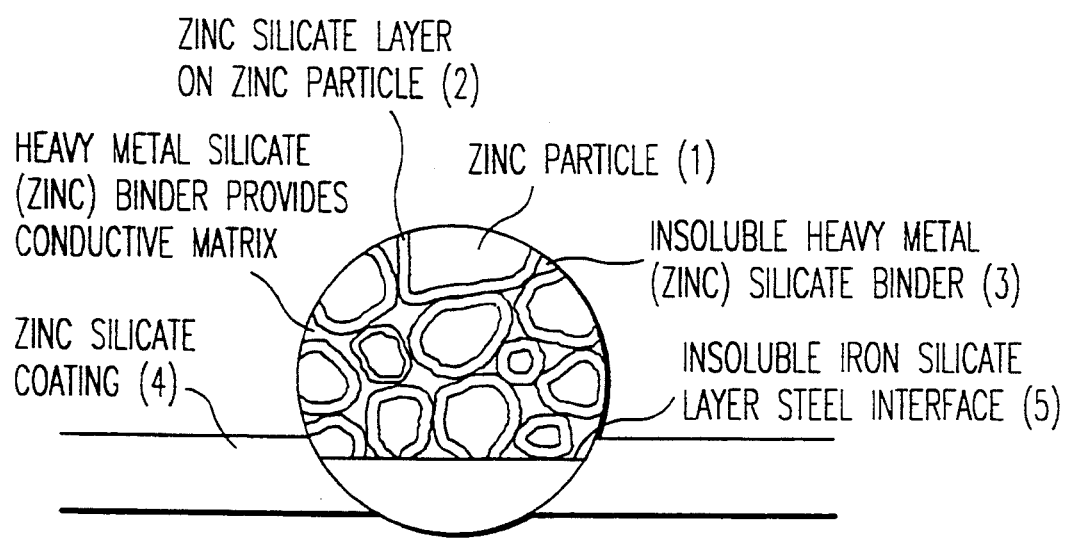
FIG. 1 shows a schematic representation of the coating of the present invention on an iron structure.
FIG. 2 shows a schematic representation of the porous microstructure of the coating of the present invention.

The present invention relates to a system for preventing corrosion of a surface or surfaces of a metal structure in contact with a corrosive environment, said structure having an exterior surface, said system comprising:

(a) a conductive zinc silicate coating in conductive contact with at least part of said exterior surface, wherein said conductive zinc silicate coating forms an interfacial layer between said exterior surface and said corrosive environment; and (b) means for imparting a net negative bias to said metal structure, said means comprising a power supply means having a negative terminal directly coupled to said metal structure and a positive terminal coupled to a portion of said metal structure, remote from the negative terminal, by way of a capacitor or resistor.

The present invention further relates to a corrosion prevention method comprising:

1) cleaning the external surface of a metal structure;
2) coating the external surface with an inorganic zinc silicate based coating; and
3) inducing and maintaining a negative bias on the metal structure.

The present system comprises two interdependent components: (1) the zinc silicate-based coating, and (2) a means for imparting a net negative bias to the metal structure to which the coating is applied. In general the zinc silicate-based coating is applied to the metallic surface after it has been cleaned, preferably by grit blasting to a commercial blast finish. When a metal surface is cleaned by grit blasting or comparable methods, the surface will have numerous grooves or indentations of from 0.1 mil up to several mil in depth. The zinc-based coating of the present invention should be applied at a depth of at least 2 mil greater than the depth of the pits formed from the grit blasting of the metal, preferably from 2 to 10 mil thickness, most preferably 7 to 9 mil thick.

The zinc silicate-based coating of the present invention can be the same coating as disclosed in U.S. Pat. No. 5,009,757 to W. Rifle which is hereby incorporated by reference. The basic building blocks of the inorganic zinc coating are silica, oxygen, and zinc. In liquid form, they are relatively small molecules of metallic silicate such as sodium silicate or organic silicate such as ethyl silicate. These essentially monomeric materials are crosslinked into a silica-oxygen-zinc structure which is the basic film former or binder for all of the inorganic zinc coatings. Suitable inorganic zinc coatings for use in the present invention are the various commercially available alkyl silicate or alkali hydrolyzed silicate types. One such commercially available paint is Carbozinc D7 WB ™ manufactured by Carboline, Inc.

There are essentially three stages in the formation of the inorganic zinc coating. The first reaction is the concentration of the silicates in the coating by evaporation, after the coating has been applied to the surface.

As the solvent evaporates, the silicate molecules and the zinc oxide come in close contact and are in a position to react with one another. This initial solvent evaporation provides for the primary deposition of film on the surface of the metal structure. The evaporation may be performed by any suitable means, such as applying heat, forcing air over the surface, or natural evaporation.

The second reaction is the oxidation of the zinc and iron metal which initiates the reaction of the zinc and iron oxides with the silicate molecule to form a zinc silicate polymer.

The third reaction is the completion of the film reaction by the continuing formation of zinc ions which react to increase the size of the zinc silicate polymer and crosslink it into a very insoluble, resistant, three-dimensional structure. This reaction continues indefinitely throughout the life of the coating, reaching a useable level of crosslinking within one to three days. Such a structure is shown schematically in FIG. 1. Such a formation of a coherent thin film is a relatively unique reaction in inorganic chemistry, since inorganic materials generally do not form coherent thin films. The only other common inorganic film is one formed by fusing inorganic material to a basic metal in order to create a ceramic enamel.

Prior to application the inorganic zinc silicate coating should preferably contain no more than 75% zinc dust or powder. Upon drying the film, the zinc content of the dry film should be at least 80% by weight, preferably 80-92%, more preferably 85-89% by weight. If the zinc content of the dry film is greater than 92% the integrity of the film is detrimentally effected.

The development of semiconductor properties in zinc oxide appears to be achieved through modification of the crystal lattice. The lattice of pure zinc oxide consists of a periodic arrangement of zinc and oxygen ions (ZnO). The charges of these ions constitute the strong ionic bond of the crystal structure and are not available for conduction. With no free electrons, the electrical conductivity is low and the material is an insulator. One method of developing semiconductor properties in zinc oxide is by inclusion of interstitial zinc atoms in zinc oxide which has been partially reduced by reaction with reducing agents, such as carbon monoxide or hydrogen at elevated temperatures (approximately 400°–900° C.). Each atom of oxygen on removal releases an atom of zinc and two electrons. The zinc atom moves to the void space between oxygen atoms, thus the designation "interstitial atom". The charge on that atom and the disposition of the electrons have been the subject of controversy among investigators for nearly half a century. It appears that the interstitial zinc atom may carry variable amounts of charge ($Zn$, $Zn^+$, and $Zn^{++}$), depending mainly on temperature, the number of free electrons varies accordingly. At room temperature, for example, the atom may be present as $Zn^+$, leaving one free electron to serve as charge carrier. The interstitial zinc ion $Zn^+$ (termed "excess zinc") contributes to the electrical conductivity of the crystal; in fact, some investigators equate such conductivity with the concentration of excess zinc.

It should be noted that the interfacial electric field generated in the system of the present invention is not due to any externally applied voltage, rather it is built-in at the metal-semiconductor. Metallic surfaces host positive dipole layers when they are interfaced with appropriately doped semiconductors to form metal and metal semiconductor and metal-oxide (insulator)—semiconductor structures. These interfacial space charge layers result in a built-in electric field and cause bending of the electronic energy bands. The net band bending is defined as the active electronic barrier. It may be added that by properly selecting the semiconductor coating material for a metal surface, one can realize both the traditional passive as well as the novel active barriers.

A metallic surface can also develop a positively charged dipole layer and the associated active electronic barrier in a metal-oxide (insulator)-p semiconductor (MOS) configuration. The active electronic barrier inhibits the net transfer of electrons from the metal surface to the oxidizing species, resulting in a lower probability of oxidation/corrosion. Additionally, the electronic barrier may help in regions having micropores and pinholes in the semiconductor layer. In these regions we expect a finite electric field (due to field fringing effects) to retard the transfer of electrons.

Zinc metal covered with zinc oxide appears to behave like a diode in that electrons travel more easily from the base metal to the oxide than they do from the oxide to the base metal. In the case of the inorganic zinc silicate coating of the present invention, any electrons traveling from a steel substrate must traverse an iron oxide layer, transfer to an iron silicate layer, and pass through a zinc silicate layer to enter the zinc metal. However, surface corrosion at the solid-liquid interface can occur if zinc ions enter the liquid from zinc metal at the surface. To do so, electrons must depart the zinc oxide at the anodic foci and travel to cathodic areas through the zinc oxide/zinc silicate layers.

To inhibit corrosion of the metallic zinc at the coating surface, the conventional approach would be to provide a surplus of electrons at the zinc surface by supplying an external anode which is either galvanically sacrificial or which provides an electrically impressed potential and current flow counter to that of the corroding metal.

The method of the present invention provides an alternative means of corrosion control by preventing the flow of electrons from ionizing zinc to the surface/water interface. This is done by preventing the flow of electrons from corroding anodic sites to cathodic sites and establishing a minute current flow internal to the inorganic zinc silicate coating. In the corrosion process the initial electrons and zinc ions are generated from the interstitial zinc common to zinc oxide. However, the continued replacement of these materials must come from the zinc metal through the n-type semiconductor zinc oxide. In the connection between the zinc oxide upon the zinc dust and the connection through the zinc silicate/sodium silicate/iron silicate/iron oxide to the substrate iron in the steel there is a n-p-n semiconductor activity.

When a pn junction diode is biased negative (−) on the p-side and positive (+) on the n-side, current flow will be inhibited. For conventional silicon diodes, the current flow drops below 1.0 $\mu A$. This simultaneously establishes a capacitance in the depleted region of the junction of about 40 pF. Very similar values are obtained in the present system. This is possible because if the substrate metal is biased negative in a capacitive circuit, the pn junction of the inorganic zinc silicate coating will see a positive charge from the initial movement of interstitial electrons to the surface/water interface. Thus, the p-side sees a negative potential and the n-side sees a positive potential and corrosion current ceases except for a very slight amount of "back current". This may be thought of as a semi-self-biasing mechanism. By blocking the flow of electrons to the coating surface the sacrificial corrosion of zinc, typical of inorganic zinc silicate coatings, is inhibited and the life of the coating is greatly extended with no reduction in the corrosion protection afforded the metal substrate.

The system of the present invention differs substantially from previous corrosion control methods in that it eliminates the chemical oxidation/reduction reactions, neither through simple electron replacement as in conventional cathodic protection systems, nor by exclusion of the chemical reactants as in conventional paint coatings, but by electronic suppression of the interface current flow essential to corrosion. This constitutes a total departure from previous practice in that there is no paint film undergoing continuous atmospheric degradation to the point that it not longer provides protective isolation for the underlying structure.

The zinc dust of the coating of the present invention forms a pn junction where the zinc metal and zinc oxide interface, with the zinc oxide becoming an n-type semiconductor and the zinc metal becoming a p-type semiconductor. This effectively forms a field effect transistor (FET).

The completed coating is schematically shown in FIG. 2. FIG. 2 shows the porous nature of the zinc silicate coating (4) of the present invention. The zinc particles (1) are covered by a zinc oxide layer (2) with the various oxide coated particles surrounded by an insoluble heavy metal silicate binder (3). At the interface (5) between the coating and the structure metal, is an insoluble metal silicate layer, which in the case of a steel structure would be an insoluble iron silicate layer.

The structure of the zinc silicate coating of the present invention resembles a metal oxide semiconductor field effect transistor (MOSFET). All metal-oxide-semiconductor field effect transistors (MOSFET) are "n" type or "p" type materials. A MOSFET has no electrical contact between the source and the drain. A glass-like insulating layer separates the gate's metal contact from the rest of the structure. It operates as follows: in a "p-n" junction there is a space charge barrier. This space charge region is one in which the normal carrier density is depleted by the thermodynamic requirements for equilibrium at the junction. If the space charge region includes a large fraction of the sample, the means of modulating the resistance of that sample are readily available since by varying the voltage on the junction the width of the space charge region can be varied over a rather wide limit. By increasing the proper voltage upon the gate one can decrease the cross-section of the conducting region through which current may flow from source to drain. Because it is difficult to extend the space charge barrier over large distances (greater than 0.01 cm) such devices must be small or divided into such small regions that the space charge barrier can extend over the entire conducting region.

The potential distribution of various applied voltages on the gate follows Poisson's equation:

$$d^2V/dx^2 = 4\pi p(\chi)/\kappa$$

where p is the space charge density at the point x, V is the value of the potential, $V_o$ the "pinch-off" voltage, and $\kappa$ is the inverse of the ion atmosphere radius, $1/\kappa$, where the ion atmosphere radius is defined as the distance from the charged surface into the solution within which the major portion of electrical interactions with the surface are considered to occur. The ion atmosphere radius is also known as the Debye length and is the effective thickness of the electrical double layer. The system of the present invention obtains the required small regions by virtue of the size of the zinc dust particles which are from 0.0007 to 0.0014 cm in diameter with about 0.0001 cm gate thickness.

The coating of the present invention is a p-metal adjacent to an n-oxide, surrounded and insulated by a silicate. The entire structure acts as if it were a steel substrate "gate" from which a field may be applied. Under conventional sacrificial protection methods, the zinc contained in the coating eventually depletes from the matrix resulting in the final failure of the coating and the substrate steel begins to corrode. The depletion of the zinc is caused by the loss of electrons through the zinc oxide layer and the loss of zinc ions.

There is ample evidence for the semiconductor nature of the zinc silicate coating of the present invention. Usually, when one increases the temperature of metals, the resistance increases. However, when the zinc silicate coating of the present invention is heated, its resistance decreases, much like a typical semiconductor in which the heat affects the movement of interstitial holes and electrons and thus increases current flow.

Additionally, when the zinc silicate is substituted for the capacitor in a R-C circuit arranged in series, the coating exhibits the characteristics of a differentiator, indicating its transistor pn-junction capacitive effect.

In a conventional FET, as the frequency of an impressed signal increases, the current flow through the gate of the FET increases, due to the inability of the relaxation time of the capacitor in a RC-circuit to have sufficient time to cause the well known "pinch effect" to occur at the gate of the FET. In the present system, as the frequency of an impressed signal through the coating of the present invention is increased, the resistance decreases, thus increasing current flow.

However, in a traditional FET, if the gate of the FET senses an external field, the dimensions of the high impedance zone in the transistor of the FET increase and the flow of holes or electrons across that boundary is severely limited or even ceases entirely. Similar effects can be seen with the coating of the present invention. Upon coating a steel plate with the zinc silicate coating of the present invention, and connecting the uncharged coated plate to an electrometer, containing an FET circuit, by way of a contact lead, the electrometer indicates a flow of electricity through the internal FET circuit of the electrometer. Upon impressing a static charge on the coated metal plate, with an electrostatically charged wand, the meter immediately indicates no current flow, since the electrons provided by the charged wand are impressing on the internal FET circuit of the electrometer and causing the gate of the FET to "pinch" off the current flow. However, if the coated steel structure is biased by an external source such as a battery, the zinc oxide/zinc particles of the zinc silicate coating are seen to function, under bias, as if they were a large number of tiny FETs and thereby block the flow of electrons from the wand to the electrometer through the coated steel plate thus allowing the internal FET circuit of the electrometer to show current flow once more.

When a conventional sacrificial system comes into contact with either water or moisture in the air, the oxide layer on the zinc is penetrated and anodic corrosion cells begin. The electrons left behind by the zinc ions migrate through the oxide layer to surface reducing sites. In order to halt the corrosion/ionization at the zinc/zinc oxide interface the travel of electrons must be reduced. This is accomplished in the present invention by the impression of a net negative bias across the system. When this biasing field is applied to the substrate steel, the oxide layer is closed to electron flow and consequently no ions can be produced and corrosion ceases. Thus, the bias upon the substrate causes the coating to act as a barrier to electron flow and reduces the corrosion of the zinc particles by several orders of magnitude over conventional coating systems.

Silicates are natural corrosion inhibitors in their own right. However, if one relies merely on the presence of silicates to prevent corrosion in the substantial absence of zinc and zinc oxide, such a coating would last for only a matter of days due to the high solubility of the silicate. However, one of the advantages gained by the presence of silicates in the formulation of the present invention takes advantage of this natural corrosion inhibition property, primarily in the event of a power loss to the means for imparting a negative bias to the metal structure. In such a case, the coating of the present invention would still provide protection until power is restored, with the protection being enhanced by the presence of the natural corrosion inhibition ability of the silicate.

The metal structure of the present invention can be any metal structure in need of protection from corrosion. Examples of such metal structures include metal vehicle parts, bridges, railroad coupling mechanisms, containers, pipes and metal towers. Examples of metal vehicle parts include metal parts of vehicles such as automobiles, airplanes, trains, military land vehicles such as tanks, and ships and other marine vehicles. As examples of containers are refinery containers, storage silos and storage bins.

The amount of current traveling from the steel through the inorganic zinc silicate system is minute. Some idea of the magnitude can be gained from an analogy with the transfer of current from a steel pipe conductor to adjacent water.

A current flowing in pipes containing water usually causes no accelerated corrosion to the inside of the pipe. The high electrical conductivity of CN compared to water (or seawater) makes it nearly impossible to generate corrosion currents across the pipe/water interface which are sufficient to accelerate corrosion. For example: The resistance of any conductor per unit length equals p/A where p is the resistivity and A is the cross-sectional area. Thus the ratio of current carried by a metal pipe compared to that carried by the water it contains is equal to $p_w A_m / p_m A_w$ where subscripts W and m refer to water and metal, respectively. For iron, pm is about $10^{-5} \Omega/cm$ and for potable water pw may be $10^4 \Omega/cm$. Assuming that the cross-sectional area of water is 10 times that of the steel pipe, it is seen that if the current flowing through the pipe is 1A, only about $10^{-8}$ A is flowing through the water. This small current leaving the pipe and entering the water causes negligible corrosion. If seawater is transported instead with $pw=20\Omega/cm$, the ratio of current carried by water to current carried by pipe is $2 \times 10^{-5}$, indicating that even in this case most of the current is carried by the metallic pipe and there is very little stray current corrosion on the inner surface of the pipe.

It is to be noted that the resistivity in fresh water is $10^4$ ohms and for salt water only 20 ohms/cm and yet the transfer of current from the very conductive steel to the water is $10^{-5}$ proportionately. In the case of the structure of the inorganic zinc silicate coating, the resistance is much greater as is shown in the table below.

TABLE I

Zinc Dust Concentration Versus Resistivity

| Zinc Dust % by Weight | Resistivity in 100 ohms/sq in |
|---|---|
| 95 | 12.7 |
| 90 | 4.0 |
| 85 | 2.5 |
| 80 | 10.5 |
| 75 | 290 |
| 70 | 1900 |
| 65 | 11,000 |
| Clear | 150,000 |

Values using the system of the present invention, when measured to ground from the system of the present invention when submerged were 0.01 μA ($10^{-8}$ A) or almost the equivalent values for the transfer of current from a conductive pipe to adjacent flowing water.

The coating of the present invention can prevent corrosion in four distinct ways: three conventional methods, and a fourth mechanism of electrochemical origin which is the thrust of the present invention. In the first conventional method, the zinc silicate coating acts as a typical barrier coating preventing moisture from reaching the coated substrate. Secondly when there are voids adjacent to the substrate and moisture does penetrate through these voids free silica will function as an inhibitor as follows:

Zinc can contribute to silica incorporation under situations approaching those where it is useful as a corrosion inhibitor, and alkalinity is not controlled (pH greater than or equal to 8). Under these conditions, the following chemical reactions are thought to occur:

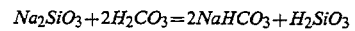
$Na_2SiO_3 + 2H_2CO_3 = 2NaHCO_3 + H_2SiO_3$

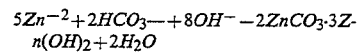
$5Zn^{-2} + 2HCO_3^- + 8OH^- \rightarrow 2ZnCO_3 \cdot 3Zn(OH)_2 + 2H_2O$

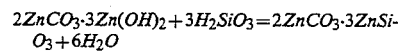
$2ZnCO_3 \cdot 3Zn(OH)_2 + 3H_2SiO_3 = 2ZnCO_3 \cdot 3ZnSiO_3 + 6H_2O$ Thus, under alkaline conditions, the permeated fluid is basic at the coating/zinc interface and there is no interruption of the chemical reaction.

In the third conventional method, the zinc within the coating acts as a sacrificial metal to provide cathodic protection as previously described. The most probable mechanism of cathodic protection of steel and seawater is a sufficient number of electrons from a preferred external source to accommodate a cathodic reaction, such as oxygen reduction or hydrogen evolution, over the whole surface of the metal being protected. In the absence of cathodic protection, the electrons reacting with the oxygen at the cathodic surfaces must be supplied by corrosion at the anodic areas (metal substrate surface). As additional electrons are supplied from an external source, the oxygen reduction reaction is accommodated by these additional electrons and fewer are required from the original anodes. This causes some of the original anodes to be converted to cathodes, and thus the current reaching the cathodic surfaces from the remaining anodes decreases as the external current increases, so that the total cathodic current density does not change substantially until all of the anodes are extinguished and the current density increases on the whole of the metal surfaces.

In the three conventional methods of corrosion prevention discussed above the idea is to first prevent a galvanic couple by refusing the moisture access to the metallic surface, by using highly waterproof paint films. Secondly, inhibitors may be used to interrupt the chemical reactions at corrosion sites, and thirdly, some other metal may be sacrificed oxidatively to protect the more desirable metal of the substrate from corrosion.

However, the method of the present invention relies on a fourth mechanism of electrochemical origin that has never been exploited to control corrosion. The present method relies on the interruption of the flow of electrons from the anodic ionizing sites through the metal to the reducing cathodic sites. Thus, if it is impossible for a metal atom in the metallic matrix to lose an electron, then ionization will cease when a certain level of negative charge is established within the metal. In conventional impressed cathodic protection systems, there is a deluge of electrons introduced from some external source so that all of the metallic surface becomes cathodic. In so doing, there is an ongoing reduction of positive ions in the adjacent solution such that gasses are evolved and various precipitates leave the solution. The biggest drawback to such cathodic protection is that an abundant and continuous supply of electricity is required.

In the system of the present invention, an electrically negative bias is established within the inorganic zinc silicate coating upon the metal substrate, by applying the charge to the substrate. Because the coating matrix is conductive, a charge field is induced within the zinc metal component of the zinc powder. The zinc/zinc oxide forms a weaken junction, wherein the applied charge and slight surface ionization causes a reverse bias, with the result that transfer of electrons from the zinc/zinc oxide to reduction sites is effectively blocked. A negative charge is thus developed in the Zn metal of the coating, with the coating having a partial positive charge overall compared to the base metal, and corrosion ceases. This differs substantially from cathodic protection, in that electrons are denied access to the coating/water interface, rather than being provided in excess, and the applied electrical charge is static, as opposed to having a current flow.

One significant advantage obtained in the present invention is that by inhibiting the corrosion of the zinc within the matrix of the inorganic zinc silicate coating, the life of the coating will be extended to be many times longer than that of conventional zinc silicate coating protection systems. While this would be possible to achieve under water through the application of cathodic current, it would require substantial current and would be very difficult to control. Further, such a cathodic system would give no benefit to protecting structures above the water where there is essentially no galvanic couple. The method of the present invention functions internally to the coating and thus prevents atmospheric corrosion where the corroding medium is nothing more than moisture in the air that is insufficient to enable cathodic protection. This becomes extremely important in protecting such surfaces as the internal surfaces of modern ships, where designs to provide increased strengths have concomitantly increased corrosion prone areas, and in protecting automobile parts, bridges, airplanes, and trains.

For example, the method of the present invention may be used to protect the internal surfaces of modern ships where the condensation is most corrosive due to its high saline content and where, at the same time, there is insufficient moisture for cathodic protection systems to function. Without the impressed negative bias of the present invention, the zinc in the inorganic zinc silicate coating would quickly leach out and be eroded away by the flow of condensate to the bilges. However, upon the application of an electrically negative bias to the metallic substrate, this leaching is effectively halted.

Additionally, the charge upon the substrate steel of the ship, provides no greater interference to shipboard electronics than turning on a light bulb within the ship, nor would it yield a detectable signal to hostile detection devices, since the field does not radiate perceptibly beyond the coating. The absorbance characteristics of zinc are well known and are often used for EM shielding and electronics enclosures. Thus, there would be no measurable EM radiation from shore-based structures to which the present system is applied.

In the present system, unlike impressed cathodic protection, there is virtually no current flow. Instead, the metal substrate is charged electrostatically in the same manner as in capacitance charging and the metal substrate and zinc oxides are reverse biased in the manner of pn or npn semiconductors so that current flow virtually ceases. Because the electrical field is internal to the coating and structure, there is little osmotic attraction of hydroxyls into the organic top coats which may be applied, nor is there any accretion of calcareous build-ups upon submerged surfaces as with impressed cathodic protection systems.

The means for imparting a net negative bias in the present system can be any means capable of providing a net negative bias sufficient to cause the net electron flow to favor electron flow into the substrate metal, rather than out of the substrate metal. Suitable means for imparting the net negative bias include direct current (DC) power supply means such as batteries, preferably 12 Volt batteries, and solar cells and alternating current (AC) power supply means. The power supply means used preferably delivers a voltage of from 0.5 to 30 V, most preferably 10 to 20 V. The power supply means of the present invention has a negative terminal directly coupled to the metal structure to be protected. The positive terminal of the power supply means is coupled to the metal structure by way of a capacitor or resistor, to a portion of the metal structure remote from the negative terminal connection. Since the present invention does not rely on creation of current flow, which drops off as the distance between terminals increases, the distance between the terminals is not critical, so long as the positive and negative terminals do not touch one another and short out the power supply. The positive terminal connection is preferably made to a location on the metal structure from 0.01 meter to 30 meters from the location of the negative terminal connection, most preferably from 5 to 10 meters from the location of the negative terminal connection.

The source for the net negative bias can be either a direct current or alternating current, depending upon the desired application. In applications for metal structures which are not in contact with bodies of water, it is preferred to use a negative bias at all times in order to prevent corrosion and prolong the life of the coating. However, for underwater uses, it is advantageous to use an alternating bias in which a negative bias is applied for 70 to 100% of the cycle, preferably greater than 85% of the cycle with 0 to 30%, preferably less than 15% of the cycle using a positive bias. Use of an alternating bias in this manner provides the anti-corrosion benefits of the present invention along with the anti-fouling characteristics of the coating of the present invention disclosed in U.S. Pat. No. 5,009,757.

The method of the present invention is self-tending for the life of the system. There are no currents or potentials to monitor and control periodically as there would be in a conventional cathodic protection system. Further, there is no possibility that the present system can go out of control and severely damage the supporting structures as can occur in an impressed cathodic protection system. The only effective reduction in the life of the coating would therefore come from wind and water-borne abrasion. Since the abrasion resistance of the coating is somewhat better than that of galvanize, the life expectancy of the coating can be extended to the range of several decades.

Having generally described this invention, a further understanding can be obtained by reference to certain specific examples which are provided herein for purposes of illustration only and are not intended to be limiting unless otherwise specified.

EXAMPLES

In order to demonstrate the effect of negatively biasing both grounded and ungrounded assemblies according to the present invention, the following experiments were conducted.

Plates of 3/16″ mild steel which has been sandblasted and coated with 0.004″ of the inorganic zinc silicate coating of the present invention were attached to electrodes and placed in tanks filled with water and ordinary table salt added to the same concentration as sea water. The plate to be negatively biased, in accordance with the present invention, was connected to a 12 Volt DC battery with a 1.0 $\mu$F capacitor between the plate and the positive terminal of the battery, as shown in FIGS. 3–8.

Figure 3:
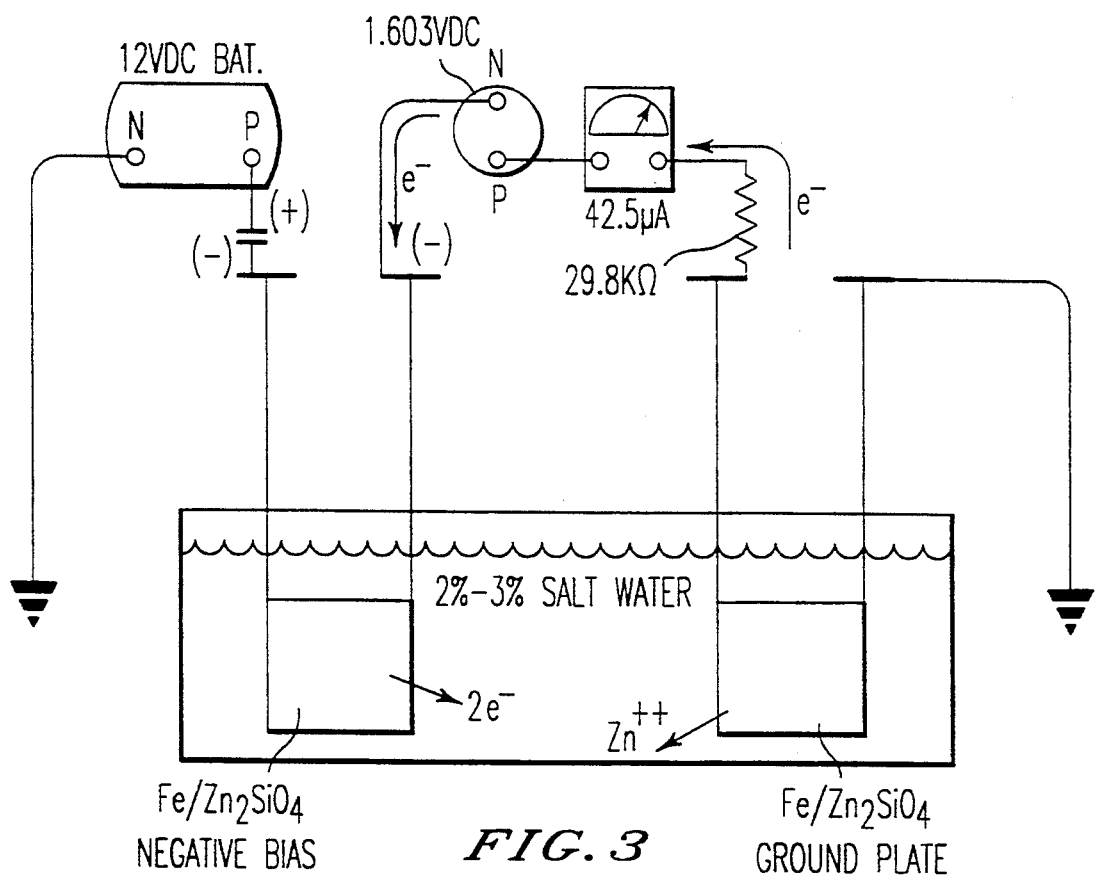
FIGS. 3-8 show the apparatus configurations used to obtain the data presented in Table II below.
Figure 4:
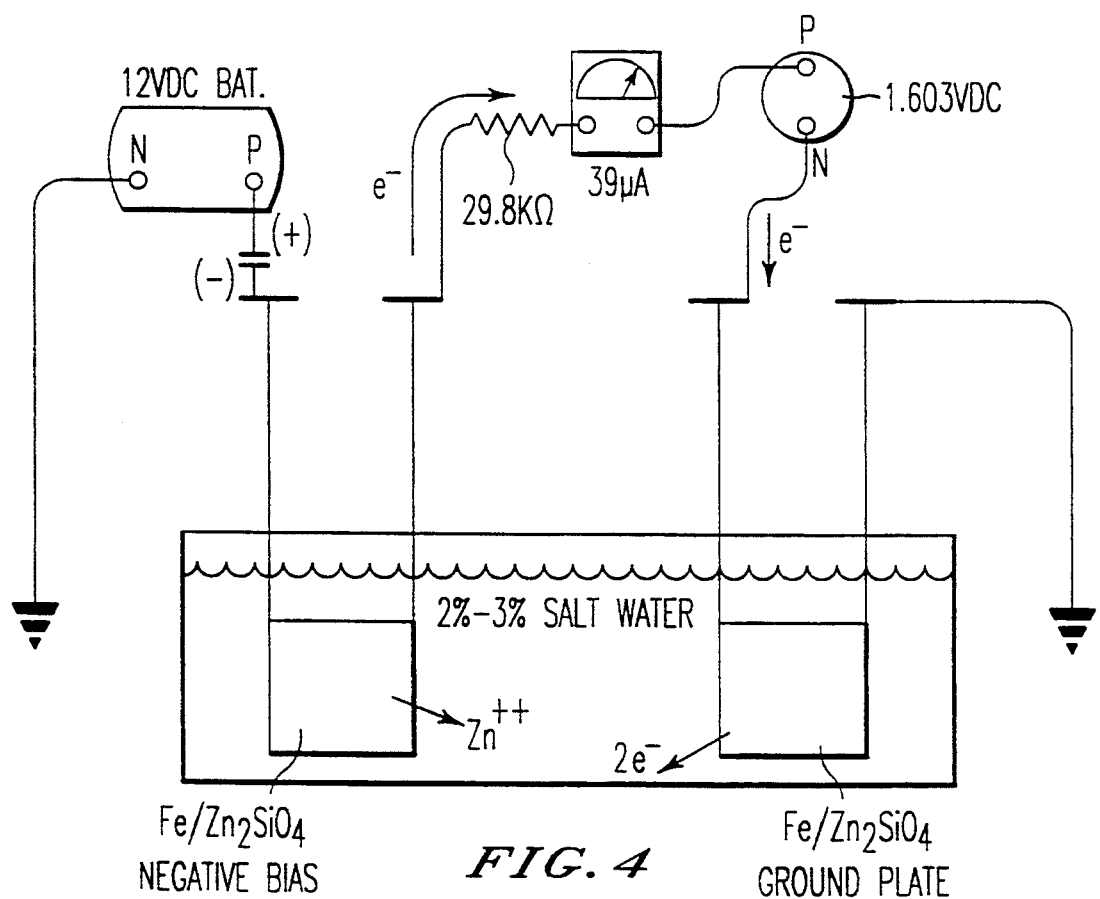
Figure 5:
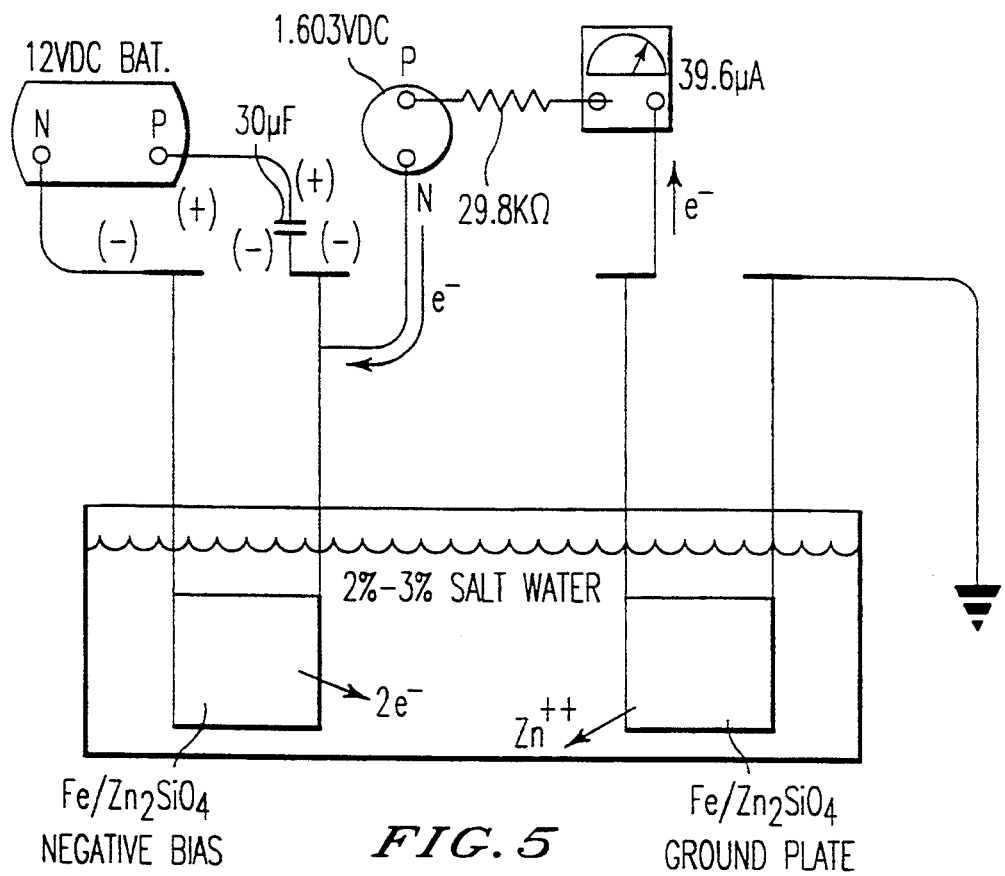
Figure 6:
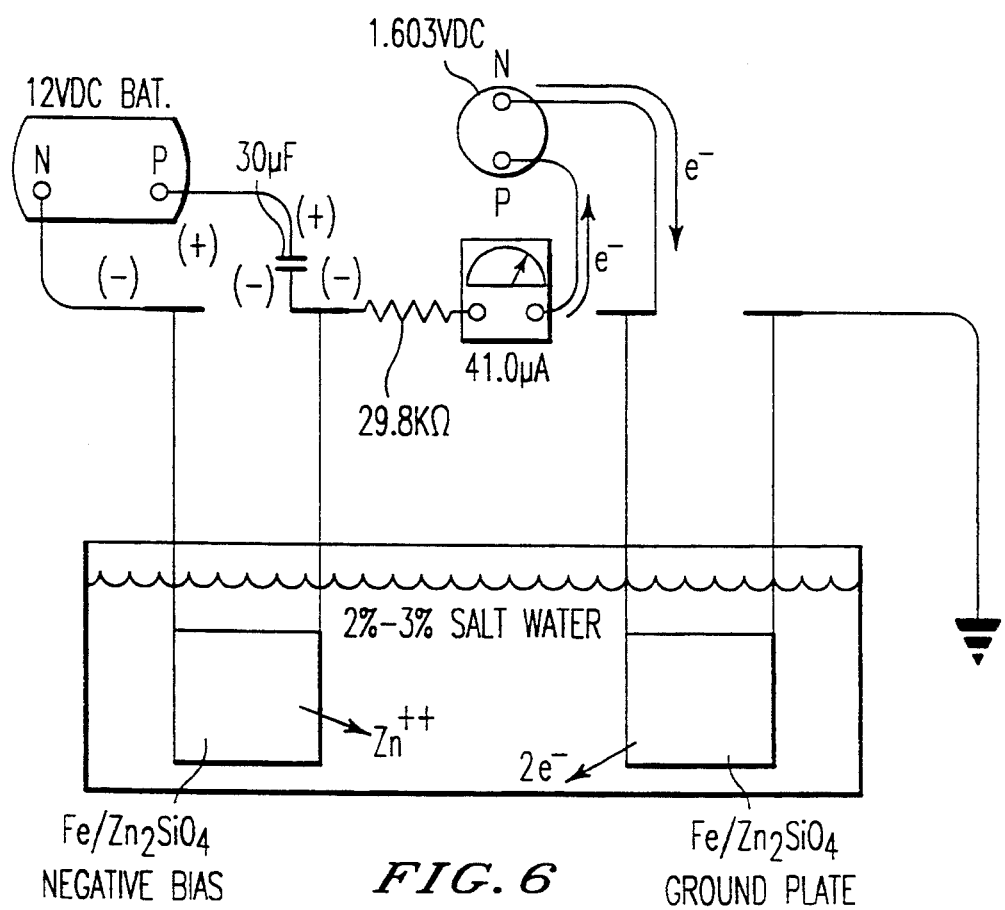
Figure 7:
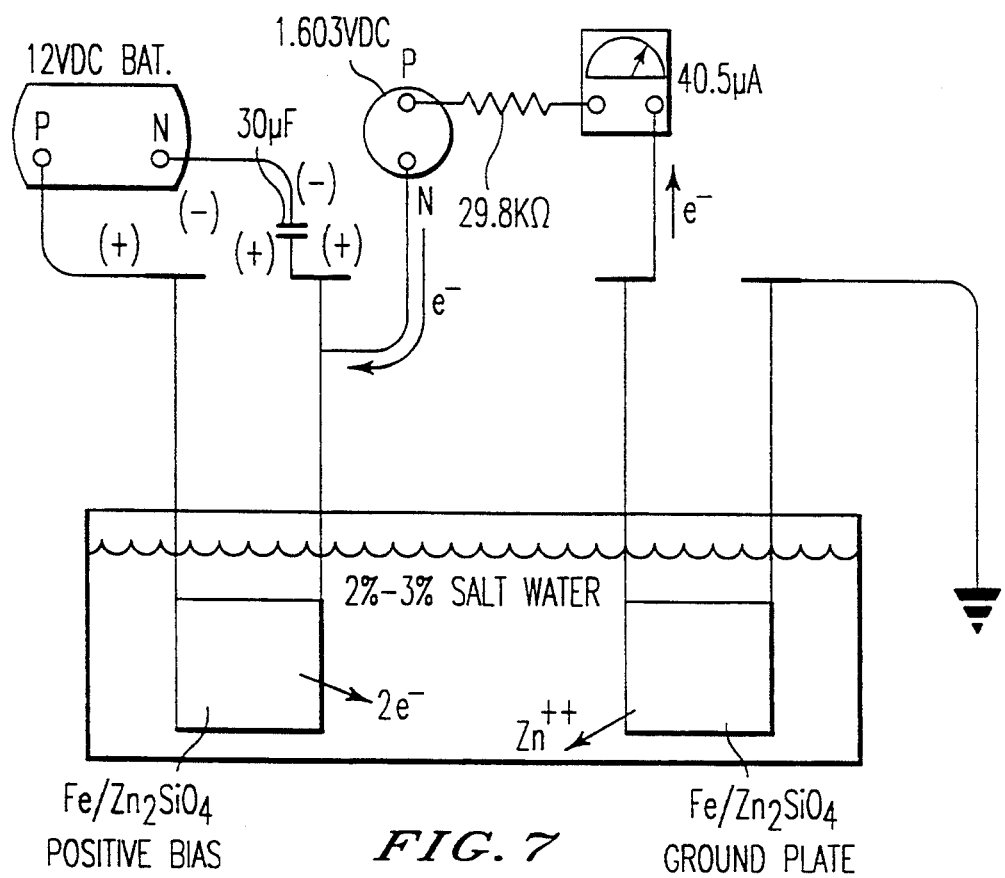
Figure 8:
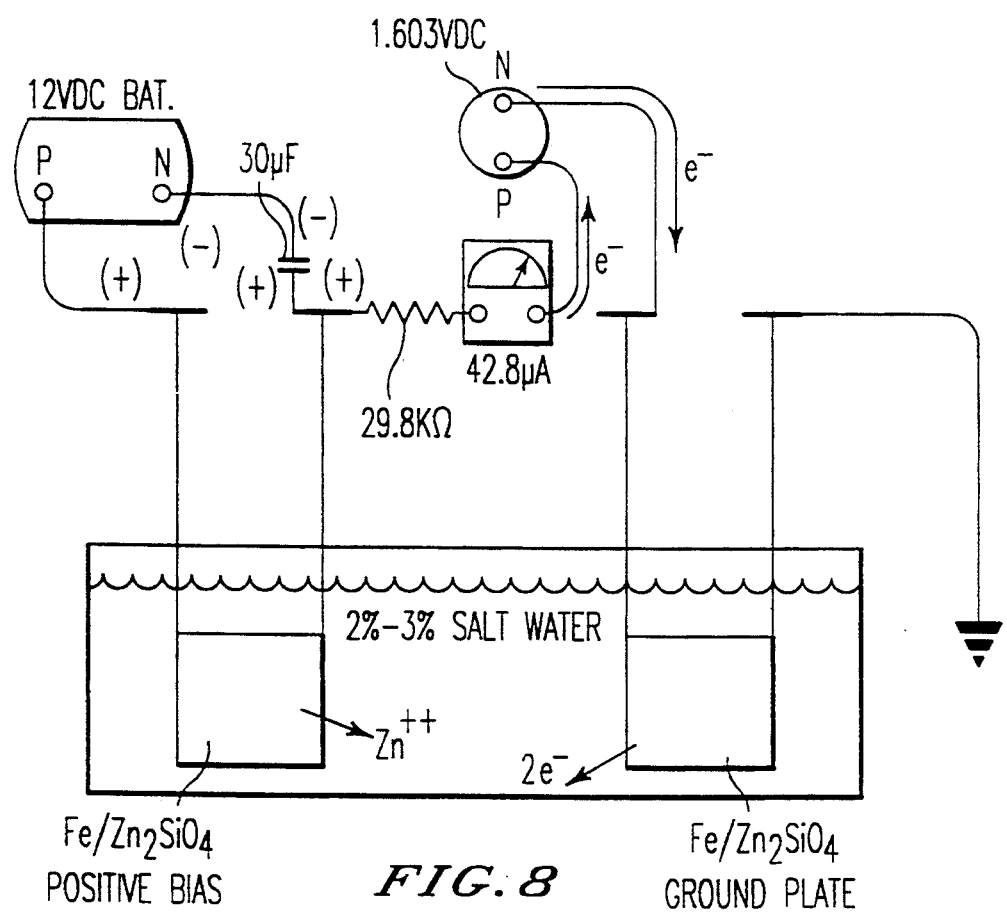

FIGS. 3–8 show the configurations used to obtain the data presented in Table II. In each case a ground plate, prepared in the same manner as the biased plate, is used, with the ground plate connected through a long copper wire to ground. FIG. 3 shows the configuration used to place a grounded negative bias on the sample plate using an impressed cathodic charge. FIG. 4 shows the configuration used to provide a grounded negative bias on the sample plate using an impressed anodic charge. FIGS. 5 and 6 show the configurations used to impose an ungrounded negative bias on the sample plate using impressed cathodic and anodic charges, respectively. FIGS. 7 and 8 show the configurations for imposing an ungrounded positive bias on the sample plate using impressed cathodic and anodic charges, respectively. The results obtained are presented in Table II. The dry cell used to impress the anodic or cathodic potentials on the biased assemblies produced 1.6 V DC. 0.8 V DC is the commonly accepted value for ionization suppression of steel/zinc in salt water. The accompanying $\mu$A values reported were approximated from that value in comparison to the 1.603 V DC dry cell battery.

TABLE II

| Potential Cat/An | GROUNDED ASSEMBLY | | UNGROUNDED ASSEMBLY | | | |
|---|---|---|---|---|---|---|
| | Negative Bias | | Negative Bias | | Positive Bias | |
| | Measured | Theoretical | Measured | Theoretical | Measured | Theoretical |
| Cathodic | 1.603 Vdc | 0.8 Vdc | 1.603 Vdc | 0.8 Vdc | 1.603 Vdc | 0.8 Vdc |
| | 42.5 $\mu$A | 101 $\mu$A | 40.48 $\mu$A | 117 $\mu$A | 40.50 $\mu$A | 81.8 $\mu$A |
| | 7.92 K$\Omega$ | | 10.68 K$\Omega$ | | 9.78 K$\Omega$ | |
| Anodic | 1.603 Vdc | 0.8 Vdc | 1.603 Vdc | 0.8 Vdc | 1.603 Vdc | 0.8 Vdc |
| | 39.00 $\mu$A | 70 $\mu$A | 39.10 $\mu$A | 86 $\mu$A | 42.80 $\mu$A | 104 $\mu$A |
| | 11.3 K$\Omega$ | | 9.30 K$\Omega$ | | 7.65 K$\Omega$ | |

It would be expected that the imposition of an anodic potential to the biased assembly would produce a tendency for the zinc and the coating to ionize into the adjacent water. From the corrosion preventive point of view, it would be desirable to minimize this type of electrochemical activity. However, as shown in the above table, the system of the present invention which provides the greatest resistance to ionization (highest K$\Omega$) under anodic pressure is the grounded assembly having a negative bias, followed in descending order by the ungrounded assembly having a negative bias and the ungrounded assembly having a positive bias. In ungrounded assemblies, those having a negative bias show better resistance to oxidation and reduction than do the assemblies with a positive bias.

In making the above measurements on the ungrounded assemblies, the positive bias measurements were made first. Following measurements of the positive bias numbers, the bias was reversed to be a negative bias. Less than 10 minutes after reversal, measurements for the negative bias assemblies were made. This indicates that there is no lengthy time delay required for the effects of biasing to be established after application of the bias.

In comparing a bias applied only to the surface of the metal in isolation to a bias applied through the means of a ground, the grounded system was found to be approximately 12.7 K$\Omega$ more resistive to electron flow than the ungrounded system.

In an additional experiment, tin metal plates were substituted for both the biased and unbiased plates of the previous experiments at the same time. Both biased and unbiased tin metal plates exhibited the same resistance to an impressed current, indicating that the observed effects are due to the zinc silicate coating of the present system rather than the circuitry used in the experiments.

Obviously, numerous modifications and variations of the present invention are possible in light of the above teachings. It is therefore to be understood that within the scope of the appended claims, the invention may be practiced otherwise than as specifically described herein.

What is claimed as New and Desired to be Secured By Letters Patent of the United States is:

1. A system for preventing corrosion of a surface of a metal structure in contact with a corrosive environment, said system comprising:
    (a) a conductive zinc silicate coating in conductive contact with at least part of said surface, wherein said conductive zinc silicate coating forms an interfacial layer between said surface and said corrosive environment; and (b) means for imparting a net negative electrostatic bias to said metal structure, said means comprising a power supply means having a negative terminal directly coupled to said metal structure and a positive terminal coupled to said metal structure, at a position remote from said negative terminal, by way of a capacitor;

wherein said surface with said conductive zinc silicate coating has an active electronic barrier in a metal-oxide-p-semiconductory configuration which inhibits a net transfer of electrons from said surface to oxidizing species.

2. The system of claim 1, wherein said metal structure comprises a metal selected from the group consisting of ferrous metals and conductive non-ferrous metals.

3. The system of claim 2, wherein said metal is steel.

4. The system of claim 2, wherein said metal is aluminum.

5. The system of claim 1, wherein said power supply means delivers from 0.5 to 30 V to said system.

6. The system of claim 1, wherein said power supply means delivers from 10 to 20 V to said system.

7. The system of claim 1, wherein said power supply means is a direct current power supply means selected from the group consisting of batteries and solar cells.

8. The system of claim 1, wherein said power supply means is an alternating current power supply means.

9. The system of claim 7, wherein said power supply means is a battery.

10. The system of claim 7, wherein said power supply means is a solar cell.

11. The system of claim 1, wherein said metal structure is selected from the group consisting of metal vehicle parts, bridge members, railroad coupling mechanisms, refineries, containers and metal towers.

12. The system of claim 1, wherein said conductive zinc silicate coating comprises zinc in an amount of from 80–92% by weight based on dry coating.

13. The system of claim 1, wherein said conductive zinc silicate coating comprises zinc in an amount of from 85–89% by weight based on dry coating.

14. A method for preventing corrosion of a surface of a metal structure in contact with a corrosive environment, said method comprising:

inducing and maintaining a net negative electrostatic bias on said metal structure, wherein said surface of said metal structure has a conductive zinc silicate coating such that said zinc silicate coating is in conductive contact with at least part of said surface and forms an interfacial layer between said surface and said corrosive environment, wherein said net negative electrostatic bias is sufficient to prevent corrosion of said surface having said conductive zinc silicate coating thereon by providing an active electronic barrier in a metal-oxide-p-semiconductor configuration which inhibits a net transfer of electrons from said surface to oxidizing species.

15. The method of claim 14, wherein said net negative bias is induced and maintained by a means comprising a power supply means having a negative terminal directly coupled to said metal structure and a positive terminal coupled to a remote portion of said metal structure by way of a capacitor.

16. The method of claim 15, wherein said power supply means delivers from 0.5 to 30 V to said metal structure.

17. The method of claim 15, wherein said power supply means delivers from 10 to 20 V to said metal structure.

18. The method of claim 15, wherein said power supply means is a direct current power supply means selected from the group consisting of batteries and solar cells.

19. The method of claim 15, wherein said power supply means is an alternating current power supply means.

20. The method of claim 18, wherein said power supply means is a battery.

21. The method of claim 18, wherein said power supply means is a solar cell.

22. The system of claim 11, wherein said containers are selected from the group consisting of storage silos and storage bins.

23. The system of claim 11, wherein said metal vehicle parts are metal parts of a vehicle selected from the group consisting of cars, trucks, tanks, marine vehicles, trains and airplanes.

* * * * *